(No Model.)
H. McHUGH & T. L. MANCHESTER.
MACHINE FOR MOLDING OR EMBOSSING PLASTIC MATERIALS.
No. 324,399. Patented Aug. 18, 1885.
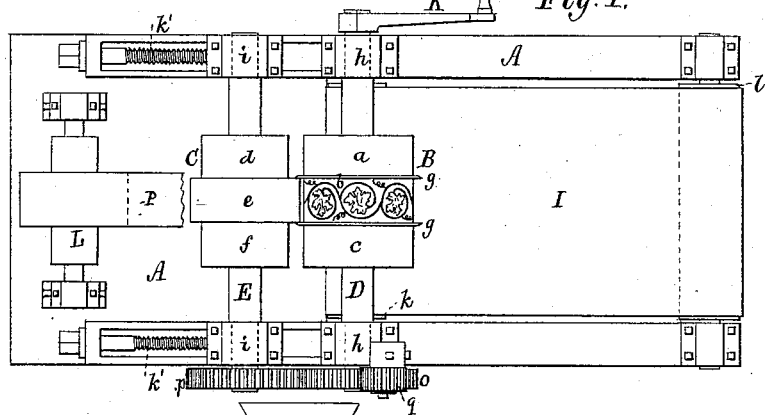
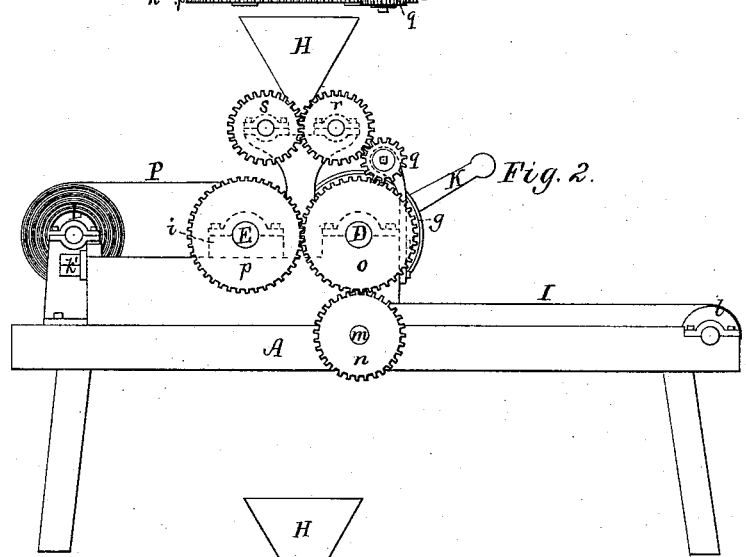
Witnesses
S. N. Piper
Ernest B. Pratt
Inventors.
Hugh McHugh,
Thomas L. Manchester
by R. H. Eddy atty

UNITED STATES PATENT OFFICE.

HUGH McHUGH AND THOMAS LEWIS MANCHESTER, OF NEW BEDFORD, MASSACHUSETTS.

MACHINE FOR MOLDING OR EMBOSSING PLASTIC MATERIAL.

SPECIFICATION forming part of Letters Patent No. 324,399, dated August 18, 1885.

Application filed June 22, 1885. (No model.)

*To all whom it may concern:*

Be it known that we, HUGH McHUGH and THOMAS LEWIS MANCHESTER, citizens of the United States, and residents of New Bedford, in the county of Bristol, of the Commonwealth of Massachusetts, have invented a new and useful Improvement in Machines for Molding or Embossing Plastic Materials; and we do hereby declare the same to be described in the following specification and represented in the accompanying drawings, of which—

Figure 1 is a top view, Fig. 2 a side elevation, and Fig. 3 a longitudinal, vertical, and median section, of a machine embodying our invention, the nature of which is defined in the claims hereinafter presented.

In Fig. 1 the hopper and feed-rolls (shown in Fig. 3) are not represented on account of exhibiting the embossing and bed rolls to advantage.

Our improvement relates to that class of molding or embossing machines for which Letters Patent No. 318,010, dated May 19, 1885, have been granted to us; one important difference between our present machine and that described in such patent being that instead of applying the circular knives to the bed-roller shaft we now apply them to the shaft of the embossing or molding roller, and directly against the ends of the embossing-section thereof, and to project therefrom and bear against and lap on the ends of that cylindrical section of the bed-roller with which the said embossing-section co-operates in effecting the molding or embossing of the plastic composition or material, from which it will be seen that the knives, in revolving, move with the embossing-section, and not against its ends, so as to wear them, as they will when projecting from the bed-roll, and revolved by and with it. In the machine shown in the said Patent No. 318,010 the circular knives project from the bed-roll, and as the embossing-section is of a softer metal, the latter soon becomes worn at its ends by the knives, so as to allow the material to pass between the knives and the said ends; but by our present improvement there can be no such wearing of the embossing-section, the knives being concentric with and butting against it at its ends, and revoluble with and by the embossing-roll.

In the drawings, A denotes the machine-frame; B, the embossing-roll, made in three cylindrical sections, *a*, *b*, and *c*, arranged and fixed upon a shaft, D, concentrically therewith.

C is the bed-roll, also made in separate cylindrical sections, *d*, *e*, and *f*, arranged as shown, and fixed upon a shaft, E, concentrically thereof, the median section *e* having a diameter larger than that of each of the sections *d* and *f*, such section *e* being extended between the two circular knives *g g*, applied to the shaft D, and against the ends of the embossing-section *b*. These circular knives are larger in diameter than the said section *b*, and extend from it and lap on and bear closely against the ends of the section *e* of the bed-roll C. The shaft E has its journals sustained by movable boxes *i i*, provided with adjusting-screws *k' k'*, so adapted to them and the frame A as to admit of the bed-roller being moved a little nearer to or farther from the embossing-roll, as the thickness of the work to be produced may require.

Directly over the bite of the embossing and bed rolls are two rolls, F and G, immediately over which is a hopper, H, the said rolls being for drawing the plastic material from the hopper and discharging it between the embossing and bed rolls.

Below the embossing-roll B is an endless apron or carrier, I, which is arranged on two rolls, *k* and *l*.

To the shaft *m* of the roll *k*, and to the shafts of the feed, embossing, and bed rolls, there is applied a train of gears, *n*, *o*, *p*, *r*, and *s*, the two gears *o* and *r* engaging with an intermediate gear, *q*. On the shaft D is a crank, K, for revolving such shaft.

In rear of the bed-roll is a roll or revoluble beam, L, for carrying a roll of paper, P, from which, when the machine is in operation, a strip of paper leads to the periphery of the section *e* of the bed-roll, and thence down between the bed and embossing rolls to and upon the endless apron.

By revolving the crank the embossing and bed rolls, the feed-rolls, and the endless apron will be put in movement, the plastic material will be drawn from the hopper, and will pass between the embossing and bed rolls and to and upon the strip of paper, which at the same velocity as the material will with it pass to and upon the endless apron, and by it be moved away from the embossing-roll, the plastic material being in the meantime molded or embossed and pressed into contact with the paper, and with it reduced to a uniform width by the circular knives, such knives operating to simultaneously trim both the material and the paper.

The paper answers a twofold purpose—viz., to support the strip of plastic material to prevent it from separating or breaking apart or stretching out of shape, and also to conduct it properly to and upon the endless apron.

We do not herein claim for molding plastic material a machine constructed and to operate as described and claimed in our said patent; nor do we claim for ornamenting jewelry-stock a machine constructed as represented in the United States Patent No. 262,369, which has no circular knives to its embossing-section, though having collars in the place of such, which in no respect perform the functions of cutting the material to be embossed; nor do we claim an embossing-roll provided with side flanges or rotary cutters to bear against the periphery of a bed-roll, as shown in the United States Patent No. 283,871.

We claim—

1. The combination of the molding and embossing roll and its fellow or bed roll with circular knives applied to the ends of the embossing-section and projecting beyond its periphery, and lapping on the ends of the next adjacent part of the said bed-roll, such rolls having mechanism for operating or simultaneously revolving them, as set forth.

2. The combination of the paper-delivery beam or roll with the molding or embossing roll and its fellow roll, and with circular knives applied to the ends of the embossing part or section of such embossing-roll, and projecting beyond its periphery and lapping on the ends of the next adjacent part or section of the said fellow roll, such fellow and embossing rolls having mechanism for simultaneously revolving them, as specified.

3. The combination of the hopper and feed-rolls, the molding or embossing roll, and its fellow roll with the circular knives applied to the ends of the embossing section or part of such embossing-roll, and projecting beyond its periphery and lapping on the ends of the next adjacent section or part of the fellow roll, all being arranged substantially as set forth.

4. The combination of the hopper, the feed-roll, the molding or embossing roll, its fellow or bed roll, the circular knives applied to the ends of the embossing section or part of the embossing roll, and lapping on those of the next adjacent section of the bed-roll, with the paper-supporting beam or roll, arranged therewith substantially as set forth.

5. The combination of the endless carrying-apron, arranged below the embossing-roll, with it and its fellow roll, and the circular knives applied to the embossing section or part of the embossing-roll, and to extend therefrom and lap on the ends of the next adjacent section of the fellow roll.

6. The combination of the paper-supporting beam or roll, the embossing-roll and fellow roll, the circular knives applied to the ends of the embossing section or part of the embossing-roll, and extending therefrom and lapping on the ends of the next adjacent section of the fellow or bed roll, and the endless apron, such apron being arranged below the embossing-roll, and with it and the fellow roll provided with mechanism for revolving them, substantially as described.

7. The combination of the hopper and feed-rolls, the embossing and bed rolls, the circular knives of the embossing-roll, the paper-supporting beam or roll, and the endless apron, all being arranged, and the said feed-rolls, embossing and bed rolls, and endless apron being provided with mechanism for revolving or moving them and the circular knives, and the latter being applied to the ends of the embossing section or part of the embossing-roll, and to extend therefrom and lap on the ends of the next adjacent section or part of the fellow or bed roll, all being substantially as specified and represented.

HUGH McHUGH.
THOMAS LEWIS MANCHESTER.

Witnesses:
THOMAS F. DESMOND,
FRANK A. MILLIKEN.